(12) United States Patent
Rodriguez et al.

(10) Patent No.: US 7,176,246 B2
(45) Date of Patent: Feb. 13, 2007

(54) PROCESS FOR CONVERTING HEAVY CRUDE OILS AND PETROLEUM COKE TO SYNGAS USING EXTERNAL SOURCE OF RADIATION

(75) Inventors: Domingo Rodriguez, Miranda (VE); Alfredo Morales, Caracas (VE); Julian Blanco, Tabernas (ES); Manuel Romero, Madrid (ES); Aldo Steinfeld, Brugg (CH)

(73) Assignee: Intevep, S.A. (VE)

( * ) Notice: Subject to any disclaimer, the term of this patent is extended or adjusted under 35 U.S.C. 154(b) by 0 days.

(21) Appl. No.: 10/954,507

(22) Filed: Sep. 29, 2004

(65) Prior Publication Data

US 2005/0192362 A1  Sep. 1, 2005

(51) Int. Cl.
- *C07C 27/00* (2006.01)
- *C07C 1/02* (2006.01)
- *C01B 3/24* (2006.01)

(52) U.S. Cl. .................. 518/704; 518/700; 518/702; 518/703; 252/373; 423/650

(58) Field of Classification Search ........... 518/700, 518/702, 703, 704; 252/373; 423/650
See application file for complete search history.

(56) References Cited

U.S. PATENT DOCUMENTS

| | | |
|---|---|---|
| 2,760,920 A | 8/1956 | Olsen |
| 3,928,000 A | 12/1975 | Child et al. |
| 3,993,458 A | 11/1976 | Antal, Jr. |
| 4,000,733 A | 1/1977 | Pauly |
| 4,059,416 A | 11/1977 | Matovich |
| 4,149,856 A | 4/1979 | Keller |
| 4,229,184 A | 10/1980 | Gregg |
| 4,290,779 A | 9/1981 | Frosch |
| 4,415,339 A | 11/1983 | Aiman et al. |
| 4,455,153 A | 6/1984 | Jakashi |
| 4,552,741 A | 11/1985 | Melchior |
| 4,582,590 A | 4/1986 | Qader |
| 4,588,478 A | 5/1986 | Warzel |
| 5,247,796 A | 9/1993 | Parker et al. |
| 5,647,877 A * | 7/1997 | Epstein ................ 48/210 |
| 5,934,271 A | 8/1999 | Kaneff |
| 6,187,465 B1 | 2/2001 | Galloway |
| 6,233,914 B1 | 5/2001 | Fisher |
| 6,384,320 B1 | 5/2002 | Chen |
| 6,510,695 B1 | 1/2003 | Fisher |
| 6,832,485 B2 | 12/2004 | Sugarmen |
| 6,872,378 B2 | 3/2005 | Weimer |
| 2003/0182861 A1 | 10/2003 | Wimer et al. |

FOREIGN PATENT DOCUMENTS

| | | |
|---|---|---|
| EP | 1520901 A | 4/2005 |
| FR | 2503177 A | 10/1982 |
| GB | 2073869 A | 10/1981 |

* cited by examiner

*Primary Examiner*—J. Parsa
(74) *Attorney, Agent, or Firm*—Bachman & Lapointe, P.C.

(57) ABSTRACT

A process for thermochemical conversion of heavy oil and petroleum coke to fluid fuels includes the steps of: providing a fossil fuel selected from the group consisting of heavy oil, petroleum coke and mixtures thereof; and exposing the fossil fuel to an external source of concentrated radiation so as to increase the temperature of the fossil fuel, supply high-temperature heat required for the desired endothermic conversion process, and convert the fossil fuel to a product selected from the group consisting of hydrogen, carbon monoxide, gaseous hydrocarbons and mixtures thereof.

15 Claims, 1 Drawing Sheet

PROCESS FOR CONVERTING HEAVY CRUDE OILS AND PETROLEUM COKE TO SYNGAS USING EXTERNAL SOURCE OF RADIATION

BACKGROUND OF THE INVENTION

The invention relates to a process for converting heavy hydrocarbons to high-quality syngas, i.e. a mixture mainly of hydrogen and carbon monoxide.

Anthropogenic emissions of greenhouse gases and other pollutants can be significantly reduced or even completely eliminated by replacing fossil fuels with cleaner fuels, e.g. solar fuels. Further, the conversion of solar energy into a chemical energy carrier that can be long-term stored and long-range transported would overcome major drawbacks of solar energy, namely, that solar energy is conventionally a diluted, intermittent, and unequally distributed energy source.

The replacement of fossil fuels with solar fuels is a long-term goal requiring the development of novel technologies. Intermediate progress along this transition would also be desirable. Clearly, the need remains for a more viable process for using solar energy to overcome the limitations mentioned above.

It is therefore the primary object of the present invention to provide a process whereby solar energy is converted to chemically stored energy.

It is a further object of the invention to provide a process wherein the stored energy is a relatively clean fossil fuel.

Other objects and advantages will appear hereinbelow.

SUMMARY OF THE INVENTION

According to the present invention, the foregoing objects and advantages have been readily attained.

According to the invention, a process is provided for thermochemical conversion of heavy oil and petroleum coke to fluid fuels, comprising the steps of providing a fossil fuel selected from the group consisting of heavy oil, petroleum coke and mixtures thereof; and exposing the fossil fuel to an external source of concentrated radiation so as to increase temperature and pressure of the fossil fuel and convert the fossil fuel to a product selected from the group consisting of hydrogen, carbon monoxide, gaseous hydrocarbons and mixtures thereof.

A preferred source of external radiation is solar energy.

This external radiation can advantageously be concentrated using parabolic dish concentrators, solar tower technology, arc lamps and the like.

BRIEF DESCRIPTION OF THE DRAWINGS

A detailed description of preferred embodiments of the present invention follows, with reference to the attached drawings, wherein.

DETAILED DESCRIPTION

Figure 1:
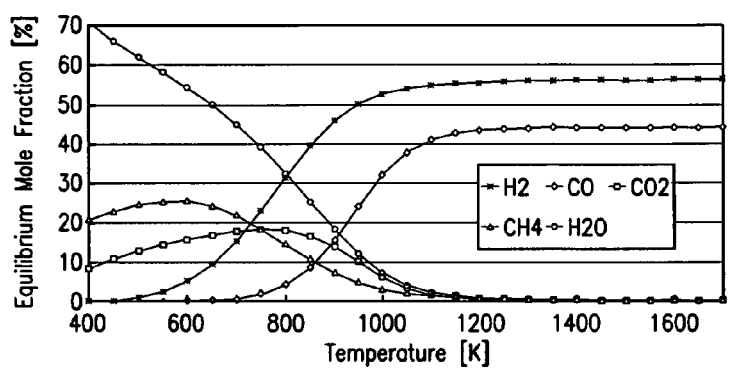
FIG. 1 shows the relationship between temperature and equilibrium mole fraction of reactants and products in a process of the present invention.

The invention relates to a process for converting fossil fuel such as heavy crude oil and petroleum coke (petcoke) to syngas using a source of external radiation, preferably solar energy.

The current limitations with using solar energy have been outlined above.

Strategically, it is desirable to consider mid-term goals aiming at the development of hybrid solar/fossil endothermic processes in which fossil fuels are used substantially exclusively as chemical reactants and external radiation such as solar energy as the source of process heat. The process of the present invention is directed toward this goal.

According to the invention, one preferred embodiment of this process is the solar gasification of petroleum coke (petcoke). This produces cleaner fuels whose energy content has been upgraded by solar energy. The calorific value of the fuel is increased above the value of the feedstock by the solar input in an amount equal to the enthalpy change of the reaction.

According to the invention, a suitable fossil fuel is provided, which can advantageously be petcoke, heavy crude oil and mixtures thereof. The fuel is exposed to an external source of radiation, preferably concentrated radiation, whereby the radiation increases the temperature of the fuel and provides the necessary high temperature process heat to drive the endothermic reactions to the desired syngas. The process can be used with other hydrocarbons as well, but a particularly preferred process is in connection with petcoke and heavy crude oils.

The external radiation can advantageously be external concentrated radiation such as that provided by parabolic dish concentrators, solar tower technology, arc lamps and the like. In addition, although solar energy is a preferred source of the external radiation, other sources can also be used, as well as hybrids with conventional fossil fuel powered sources of radiation. The equipment for providing these sources of concentrated radiation are known to a person of skill in the art. As set forth below, the resulting final product can be used to power conventional combustion engines or power plants, or can be further processed to further refined products such as more pure hydrogen, synthetic fuels and chemicals and the like, for example to products more suitable as fuel for fuel cells, and the like.

Suitable oxidant can advantageously include steam, oxygen, metal oxides, other oxygen containing compounds and mixtures thereof. A preferred oxidant is steam, and using essentially steam, and advantageously without the need for pure oxygen, a product mixture of essentially hydrogen and carbon monoxide can be produced.

In the embodiment wherein the feed to be treated includes petcoke particles, these particles advantageously serve to both absorb radiation and act as chemical reactants to the desired end product.

According to the invention, the fossil fuel can advantageously contain both petcoke particles and heavy liquid crude oil. This fossil fuel can be entrained in a stream of suitable carrier, which is preferably also a reactant, such as steam, oxygen, or other gaseous oxidant, and the like. This stream of entrained fossil fuel can be used to enhance exposure of the fossil fuel to the radiation, both through atomizing and increasing of surface area to the radiation.

Further, radiation is preferably applied to the feed through an optical access, i.e. a window, or some other kind of suitable aperture. The flow or stream of carrier can be adapted to serve as an aerodynamic curtain to keep the optical access clean, thereby reducing the maintenance needed to keep the process of the present invention efficient. Keeping the window or other optical access through which radiation is passed clean allows maximum effect of the radiation upon the fossil fuel as desired.

According to the invention, external concentrated radiation is advantageously applied to the fossil fuel so as to provide a temperature of at least about 1000° C. and to supply the enthalpy, sensible and latent heat required for the reaction.

When a conventional process is practiced at an industrial scale, the energy required for heating the reactants and for the heat of the reaction is conventionally supplied by burning a significant portion of the feedstock, either directly by internal combustion, or indirectly by external combustion. Internal combustion, as applied in autothermal reactors, results in the contamination of the gaseous products, while external combustion, as applied in allothermal reactors, results in lower thermal efficiency because of the irreversibilities associated with indirect heat transfer.

Alternatively, the advantages of supplying solar energy for process heat in accordance with the present invention are three-fold: 1) the calorific value of the feedstock is upgraded; 2) the gaseous products are not contaminated by the byproducts of combustion; and 3) the discharge of pollutants to the environment is avoided. Further, the direct irradiation of reactants provides a very efficient means of heat transfer directly to the reaction site, where the energy is needed, bypassing the limitations imposed by heat exchangers.

The steam-gasification of carbonaceous materials and related reactions has been performed using solar energy in exploratory early studies with coal, and with oil shales. More recently, the $CO_2$-gasification of coal was investigated using a fluidized bed reactor under direct irradiation. Several solar reactor concepts have been proposed and tested with small-scale prototypes.

The steam-gasification of petcoke is a complex process, but the overall chemical conversion can be represented by the simplified net reaction:

$$C_1H_xO_y + (1-y)H_2O = \left(\frac{x}{2} + 1 - y\right)H_2 + CO \quad (1)$$

where x and y are the elemental molar ratios of H/C and O/C in petcoke, respectively. The chemical product is synthesis gas (syngas), whose quality depends on x and y. Table 1 shows the approximate chemical composition, the heating value, and the elemental molar ratios for three different types of petcoke: Flexicoke, and Delayed Coke from Petrozuata and Amuay. In the analysis that follows, sulfur compounds and other impurities contained in the raw materials are assumed to be cleaned out. The moisture content is also not accounted for in Eq. (1), but the stoichiometric addition of water can be adjusted accordingly.

TABLE 1

Approximate main elemental chemical composition in wt % (ultimate analysis), low heating value in kJ/kg, and elemental molar ratios of H/C and O/C, for three types of petcoke.

| petcoke type | Flexicoke | Delayed Coke | |
| --- | --- | --- | --- |
| | | Petrozuata | Amuay |
| C | 92.70 | 88.21 | 88.47 |
| H | 0.67 | 4.14 | 4.17 |
| O | 0.92 | 1.46 | 1.42 |
| N | 0.90 | 2.28 | 1.84 |
| S | 1.98 | 4.16 | 4.18 |
| LHV [kJ/kg] | 32983 | 35876 | 35926 |
| H/C [mol/mol] | 0.0859 | 0.5581 | 0.5598 |
| O/C [mol/mol] | 0.0074 | 0.0124 | 0.0120 |

Equation (1) summarizes the overall reaction, but a group of competing intermediate reactions that are essential for the successful gasification need to be considered, namely:

$$\text{steam-gasification: } C_{(gr)} + H_2O = CO + H_2 \quad (2)$$

$$\text{Boudouard equilibrium: } 2CO = C_{(gr)} + CO_2 \quad (3)$$

$$\text{hydro-gasification (methanization): } C_{(gr)} + 2H_2 = CH_4 \quad (4)$$

$$\text{reforming: } CH_4 + H_2O = CO + 3H_2 \quad (5)$$

$$\text{water-gas shift: } CO + H_2O = CO_2 + H_2 \quad (6)$$

all of which depend strongly on the temperature as well as on the pressure and the carbon/oxygen ratio, and determine the relative amounts of $H_2$, $H_2O$, CO, $CO_2$, $CH_4$, in the gas phase, and C(gr) in the solid phase. The HSC Outokumpu code was used to compute the equilibrium composition of the system $C_1H_xO_y + (1-y)H_2O$ at 1 bar and over the range of temperatures of interest. FIG. 1 shows the results for the Delayed cokes. Species whose mole fraction is less than $10^{-5}$ have been omitted. Below about 700 K, C (gr), $CH_4$, $CO_2$, $H_2O$ are the thermodynamically stable components. In the temperature range 800–1100 K, they are used up by a combination of reactions (1) to (6). When the gasification goes to completion, at above about 1200 K, the system consists of a single gas phase containing $H_2$ and CO in a molar ratio equal to (x/2+1−y). At higher pressures, as preferred in industrial applications, the thermodynamic equilibrium of Eq. (1) is shifted to the left in such a way so as to relieve the pressure in accordance with Le Chatelier's principle. For example, at 10 bar, the equilibrium composition is shifted such that the gasification goes to completion at above 1500 K. The results for the other two types of petcoke are comparable to the ones shown in FIG. 1, and the same conclusions can be drawn regarding temperature requirements.

The quality of the syngas produced is described by the $H_2$/CO and $CO_2$/CO molar ratios. The $H_2$/CO molar ratio can be adjusted by the water-gas shift reaction to meet the requirements for the post-processing of syngas to hydrogen, ammonia, methanol, or Fischer-Tropsch's chemicals. The $CO_2$/CO molar ratio is a measure of the contamination and should preferably be kept as low as possible. Thermodynamics predict a $CO_2$-free syngas at above 1300 K. The syngas quality is notably higher than the one typically obtained when heat is supplied by internal combustion of petcoke, besides the additional benefit of avoiding contamination by undesirable species. The CO content in the syngas can be further processed via the exothermic water-gas shift reaction to obtain more $H_2$ and process heat, and the resulting $H_2/CO_2$ mixture can be separated.

Figure 2A:
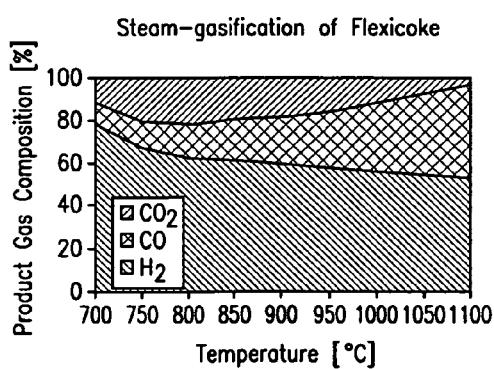
FIGS. 2a–b show an example of product gas composition as a function of temperature for two types of petcoke processed according to the present invention.
Figure 2B:
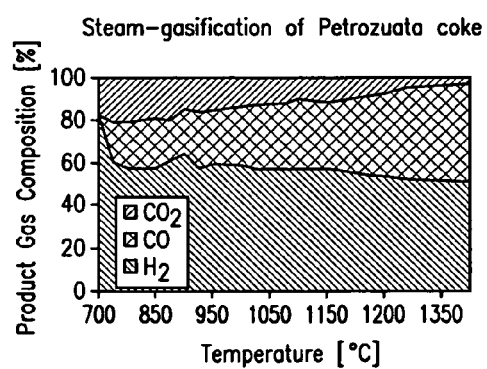

The high quality of the syngas produced that is predicted by thermodynamics (see FIG. 1) has been verified experimentally using a fluidized bed of petcoke and steam directly exposed to an external source of concentrated thermal radiation. FIG. 2 shows the gas product composition as a function of temperature for the 2 types of petcoke listed in Table 1, that is, FIG. 2a shows results for Flexicoke and FIG. 2b shows results for Petrozuata coke. Temperatures were measured by pyrometry and by thermocouples submerged in the fluidized bed; gas composition was measured by gas chromotagraphy at the exit of the fluidized bed.

A $2^{nd}$-Law (exergy) analysis was performed to examine two technically viable routes for extracting power from the chemical products of the gasification, and to establish a base for comparing them with electricity generation by conventional power plants. The two routes are: 1) syngas produced by solar steam-gasification of petcoke is used to fuel a 55%-efficient combined Brayton-Rankine cycle; and 2) syngas produced by solar steam-gasification of petcoke is further processed to $H_2$ by the water-shift gas reaction followed by $H_2/CO_2$ separation, and the $H_2$ is used to fuel a 65%-efficient fuel cell.

The exergy analysis indicates that both routes can double the specific electrical output and, consequently, reduce by half the specific $CO_2$ emissions, vis-à-vis a petcoke-fueled 35%-efficient Rankine cycle.

In summary, the proposed petcoke and heavy crude oil/solar hybrid thermochemical process conserves petroleum and reduces emissions. It further converts intermittent solar energy into a storable and transportable chemical fuel, to meet energy demands whenever and wherever needed. At the same time, petcoke is solar-upgraded to a cleaner fluid fuel that can be used for electricity generation in highly efficient combined cycles or fuel cells. In contrast to the gasification using process heat derived from the internal petcoke combustion, the solar-driven gasification produces high quality syngas that is not contaminated by the products of combustion. Syngas can be further processed to separate streams of $H_2$ and $CO_2$; if the latter is sequestered, the proposed process becomes a decarbonization process that converts petcoke to hydrogen without release of $CO_2$ to the atmosphere.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for thermochemical conversion of heavy oil and petroleum coke to fluid fuels, comprising the steps of:
    providing a fossil fuel selected from the group consisting of heavy oil, petroleum coke and mixtures thereof; and
    exposing the fossil fuel to an external source of concentrated radiation so as to increase temperature of the fossil fuel to a temperature of at least about 1000° C. and convert the fossil fuel to a product selected from the group consisting of hydrogen, carbon monoxide, gaseous hydrocarbons and mixtures thereof.

2. The process of claim 1, wherein the source of external radiation is concentrated solar energy.

3. The process of claim 1, wherein the final product comprises hydrogen and carbon monoxide.

4. The process of claim 1, wherein the final produce consists essentially of hydrogen and carbon monoxide.

5. The process of claim 1, further comprising the step of converting the final product to a further refined product selected from the group consisting of hydrogen, synthetic fuels and chemicals, and mixtures thereof.

6. The process of claim 1, wherein the conversion uses an oxidant, and wherein the oxidant is selected from the group consisting of steam, oxygen, metal oxides, other oxygen-containing compounds, and mixtures thereof.

7. The process of claim 6, wherein the oxidant is steam.

8. The process of claim 1, wherein the exposing step converts the fossil fuel without the need for pure oxygen as reactant.

9. The process of claim 1, wherein the exposing step is carried out using only steam as oxidant, resulting in a product mixture of hydrogen and carbon monoxide.

10. The process of claim 1, wherein the source of external radiation provides sensible and latent heat required to bring reactants to the reaction temperature.

11. The process of claim 1, wherein the source of external radiation is created by hybrid operation with fossil fuels.

12. The process of claim 1, wherein the fossil fuel comprises petroleum coke particles and heavy crude oil directly exposed to the external source of radiation, whereby the fossil fuel simultaneously serves as radiant absorber and chemical reactant.

13. The process of 12, further comprising the step of entraining the particles of petroleum coke and heavy crude oil in a flow of steam, oxygen, or other gaseous oxidant.

14. The process of claim 13, wherein the flow serves simultaneously as reactant and as an aerodynamic curtain to keep a window clean for access of radiation to the fossil fuel.

15. The process of claim 1, wherein said product consists essentially of hydrogen, carbon monoxide and mixtures thereof.

* * * * *

UNITED STATES PATENT AND TRADEMARK OFFICE
CERTIFICATE OF CORRECTION

PATENT NO. : 7,176,246 B2
APPLICATION NO. : 10/954507
DATED : February 13, 2007
INVENTOR(S) : Domingo Rodriguez et al.

It is certified that error appears in the above-identified patent and that said Letters Patent is hereby corrected as shown below:

On the Title Page the Assignee section should be amended to read as follows:

(1) Intevep, S.A. (VE)

(2) Clemat (Centro De Investigaciones Energeticas Medioambientales Y Tecnologicas) (ES)

(3) ETHZ (Swiss Federal Institute Of Technology) (CH)

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO.         : 7,176,246 B2  
APPLICATION NO.    : 10/954507  
DATED              : February 13, 2007  
INVENTOR(S)        : Domingo Rodriguez et al.

Page 1 of 1

It is certified that error appears in the above-identified patent and that said Letters Patent is hereby corrected as shown below:

On the Title Page the Assignee section should be amended to read as follows:

(1) Intevep, S.A. (VE)

(2) Ciėmat (Centro De Investigaciones Energeticas Medioambientales Y Tecnologicas) (ES)

(3) ETHZ (Swiss Federal Institute Of Technology) (CH)

This certificate supersedes the Certificate of Correction issued August 12, 2008.

Signed and Sealed this

Fourth Day of November, 2008

JON W. DUDAS  
*Director of the United States Patent and Trademark Office*